US005269545A

United States Patent [19]

Huebschen et al.

[11] Patent Number: 5,269,545

[45] Date of Patent: Dec. 14, 1993

[54] PLASTIC UTILITY CART WITH SLIDING COVER AND ACCESSORIES

[75] Inventors: David A. Huebschen, Kenosha; Kirk E. Mellits; Timothy B. Strandell, both of Racine; Gregory A. Zurbuchen, Kenosha, all of Wis.

[73] Assignee: Snap-on Tools Corporation, Kenosha, Wis.

[21] Appl. No.: 886,868

[22] Filed: May 22, 1992

[51] Int. Cl.$^{5}$ .......................... B62B 3/02; B62B 5/00

[52] U.S. Cl. .......................... 280/47.35; 280/79.2; 220/345; 220/521

[58] Field of Search .......................... 280/32.5, 32.6, 87.021, 280/47.34, 47.35, 79.11, 79.2; 248/129, 430; 220/345, 346, 521

[56] References Cited

U.S. PATENT DOCUMENTS

| | | | |
|---|---|---|---|
| D. 137,626 | 4/1944 | Adams | 280/47.35 X |
| D. 158,876 | 6/1950 | Lowell | 280/47.35 X |
| 2,525,208 | 10/1950 | Clink | 280/47.35 X |
| 2,701,168 | 2/1955 | Schemers | 280/32.5 X |
| 2,872,252 | 2/1959 | Konkle | 280/32.5 X |
| 3,012,796 | 12/1961 | Mieding | 280/47.34 X |
| 4,068,855 | 1/1978 | Hackett . | |
| 4,512,503 | 4/1985 | Gioso | 220/521 X |
| 4,699,391 | 10/1987 | Syring . | |
| 4,721,316 | 1/1988 | Whiteside | 280/32.6 |
| 4,725,032 | 2/1988 | Kazadka et al. | 248/430 |
| 4,923,202 | 5/1990 | Breveglieri et al. | 280/47.35 |
| 4,976,450 | 12/1990 | Ellefson . | |
| 5,040,811 | 8/1991 | Busken et al. . | |
| 5,058,911 | 10/1991 | Hunter et al. . | |
| 5,078,414 | 1/1992 | Court et al. | 280/47.35 X |
| 5,080,381 | 1/1992 | Perez | 280/35 |

FOREIGN PATENT DOCUMENTS

| | | | |
|---|---|---|---|
| 2178702 | 2/1987 | United Kingdom | 280/32.6 |

OTHER PUBLICATIONS

Rubbermaid catalog, p. 109. Pub. date unknown.

MetroFlex catalog, InterMetro Industries Corporation, pp. 1-16, 1989.

Snap-on Tools Corporation catalog, p. 32 Pub. date unknown.

*Primary Examiner*—Brian L. Johnson

*Attorney, Agent, or Firm*—Emrich & Dithmar

[57] ABSTRACT

A molded plastic utility cart includes a one-piece hollow molded frame filled with a foamed plastic material, the frame being generally I-shaped in configuration and including an upstanding wall with a generally horizontal base at its lower end and a generally horizontal top at its upper end defining an open-top receptacle. A plastic cover is slidably mounted on the top for movement between a closed position covering the receptacle and an open position extending laterally from the top and uncovering the receptacle. The cover itself defines additional receptacle compartments. Accessory article supports may be mounted on any of the upstanding wall portion, the base or the top, and may be in the nature of additional receptacles, tool hangers or the like. A plurality of caster wheels are mounted on the underside of the base and handles are provided at both ends of the top.

20 Claims, 2 Drawing Sheets

Fig 5
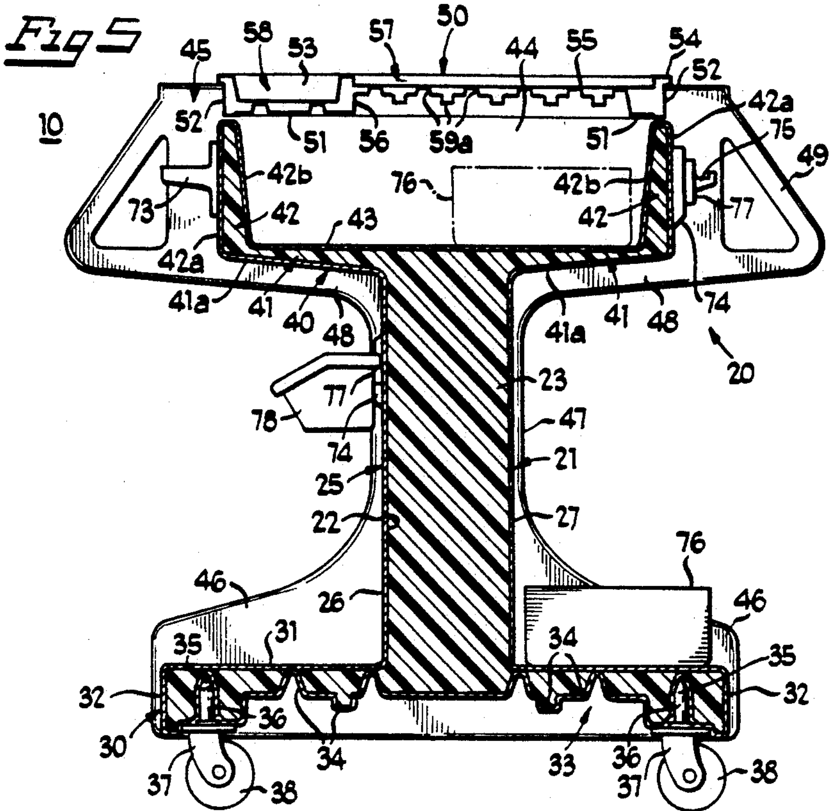
Fig 7
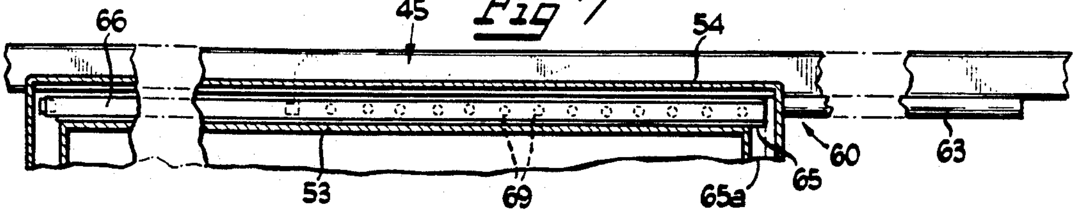
Fig 6
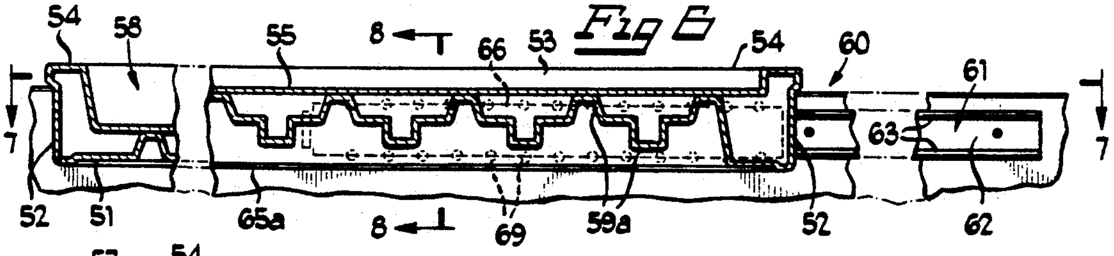
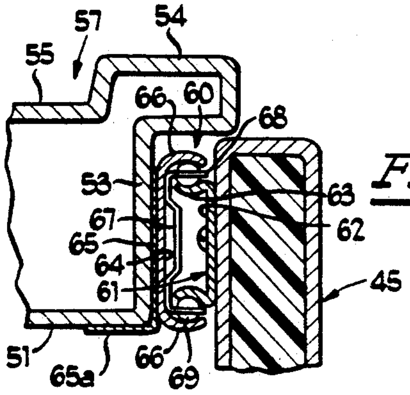
Fig 8

PLASTIC UTILITY CART WITH SLIDING COVER AND ACCESSORIES

BACKGROUND OF THE INVENTION

1. Field of the Invention

The present invention relates to utility carts of the type used by mechanics for carrying tools and the like.

2. Description of the Prior Art

Automotive mechanics have used various types of tool cabinets, carts and chests for carrying the large number of tools, instruments and parts which must be used in repair and maintenance of modern automotive vehicles. Many of these are supported on wheels or rollers so that they can be moved easily from place to place in a repair facility. These tool containers include utility carts which can be used for semipermanent storage of selected tools and also for temporary carrying of selected tools, parts or other devices for use in particular applications.

Prior utility carts are typically formed of metal and are of relatively complicated and expensive construction. Furthermore, they can typically only be moved alongside a vehicle being worked on and, accordingly, the mechanic working in the engine compartment must still repeatedly move back and forth between the engine compartment and the utility cart to obtain and replace selected tools.

It is known to provide utility carts formed of plastic, but such plastic carts have been of rather complicated construction and have not been adapted for use in the automotive repair field.

SUMMARY OF THE INVENTION

It is a general object of the present invention to provide an improved utility cart which avoids the disadvantages of prior utility carts while affording additional structural and operating advantages.

An important feature of the invention is the provision of a utility cart which is of simple and economical construction Another feature of the invention is the provision of a utility cart of the type set forth, which is shaped and designed to facilitate use in automotive repair applications.

In connection with the foregoing feature, still another feature of the invention is the provision of a utility cart of the type set forth which provides extensible means for extending over the engine compartment of a vehicle being worked on.

Another feature of the invention is the provision of a utility cart which is adapted for use with a variety of accessory carriers and receptacles.

A further feature of the invention is the provision of a utility cart which is rugged yet will not scratch or damage a vehicle with which it comes in contact, nor is it susceptible to denting, rusting or flaking.

These and other features are attained by providing a utility cart comprising: an upstanding side wall having an upper end and a lower end, a base integral with the side wall at the lower end thereof and extending laterally therefrom to a free distal end, a top integral with the side wall at the upper end thereof and extending laterally therefrom to a free distal end, at least one receptacle disposed on at least one of the wall and the base and the top, and rotatable support means on the underside of the base for rolling movement along an underlying support surface.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

FIG. 5 is a further enlarged view in vertical section taken along the line 5—5 in FIG. 3;

FIG. 6 is an enlarged, fragmentary view in vertical section taken along the line 6—6 in FIG. 4;

FIG. 7 is a fragmentary view in horizontal section taken along the line 7—7 in FIG. 6; and FIG. 8 is a still further enlarged, fragmentary view in vertical section taken along the line 8—8 in FIG. 6.

DESCRIPTION OF THE PREFERRED EMBODIMENT

Figure 1:
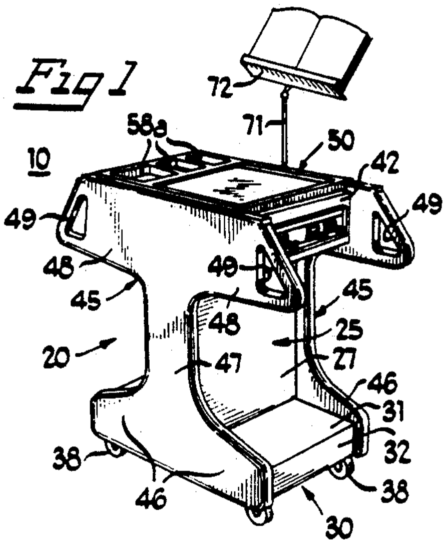
FIG. 1 is a perspective view of a utility cart constructed in accordance with and embodying the features of the present invention and with the cover disposed in its closed or retracted position.
Figure 2:
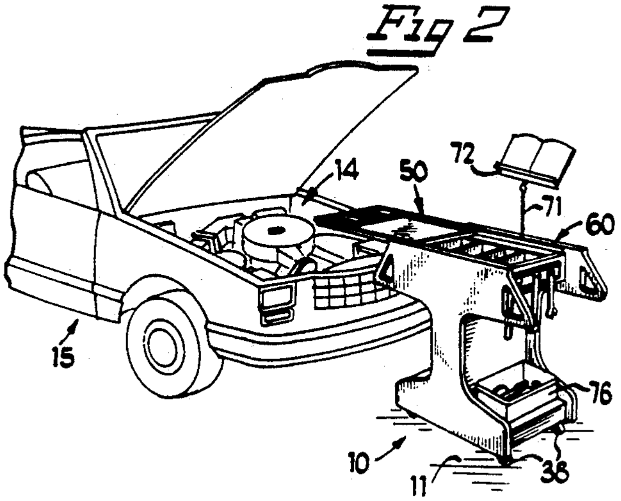
FIG. 2 is a reduced view similar to FIG. 1, illustrating the use of the utility cart with an associated automobile and illustrating the cover in its open or extended position and with an accessory receptacle carried on the cart.

Referring to FIGS. 1 and 2, there is illustrated a utility cart, generally designated by the numeral 10, constructed in accordance with the present invention, and adapted for rolling engagement along an underlying floor or other support surface 11. The cart 10 is particularly adapted for use by automotive mechanics and is particularly useful when the mechanic is working in the engine compartment 14 of an automotive vehicle 15, as will be explained in greater detail below.

Figure 3:
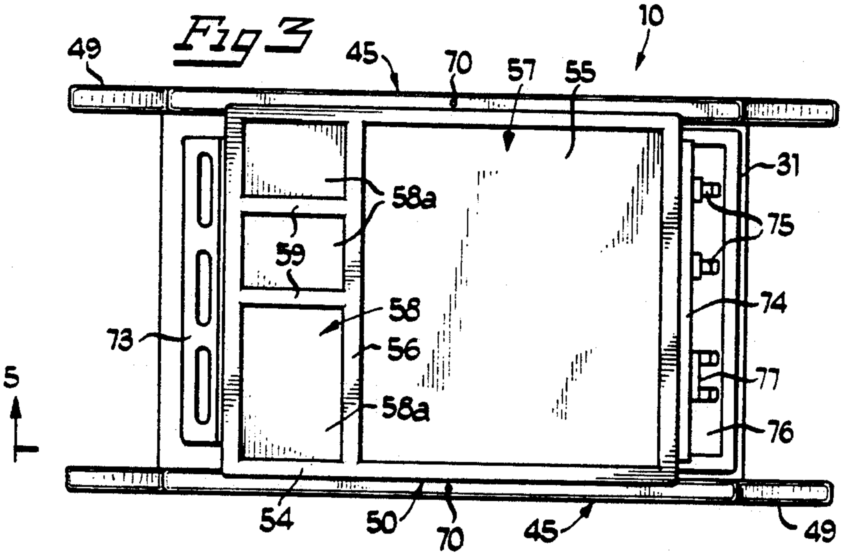
FIG. 3 is an enlarged top plan view of the utility cart illustrated in FIG. 2, with the literature stand removed and with the cover shown in its retracted or closed position.
Figure 4:
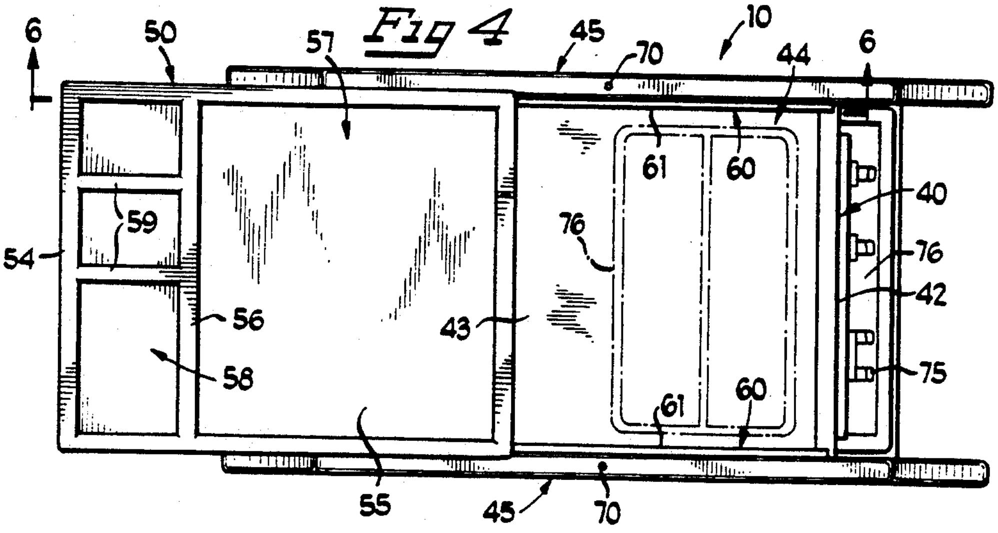
FIG. 4 is a view similar to FIG. 3, with the cover shown in its extended or open position.

Referring also to FIGS. 3-5, the cart 10 has a unitary, one-piece frame 20 which is formed of a suitable molded plastic. More specifically, the frame 20 includes an outer shell 21, which may be formed by blow molding, twin sheet forming, or rotational molding of a suitable plastic, such as polyethylene, the shell 21 defining a hollow cavity 22 therein. The cavity 22 is filled with a body 23 of foamed plastic, such as polyurethane, to provide rigidity to the frame 20. The frame 20 has a generally I-shaped configuration, including an upstanding center column or wall structure 25 defining parallel front and rear walls 26 and 27. Unitary with the center column 25 at its lower end and extending forwardly and rearwardly therefrom in cantilever fashion is a base 30 having a flat, planar top wall 31 which defines substantially horizontal front and rear platforms or shelves. The top wall 31 is unitary at its distal ends with depending end walls 32 which are, in turn, unitary with an irregular bottom wall 33 provided with a plurality of stiffening ribs and recesses 34. The bottom wall 33 also defines four sockets 35 (two shown) which respectively receive the pivot stems 36 of four casters 37, the wheels 38 of which are disposed for rolling engagement with the underlying floor 11. Preferably, at least two of the casters 37 are swivel casters to facilitate guiding movement of the cart 10.

Unitary with the center column 25 at its upper end is a top 40 which includes a pair of generally horizontal arms 41 respectively cantilevered forwardly and rearwardly from the center column 25 generally parallel to the base 30. The arms 41 are respectively provided at their distal ends with upstanding ends 42. The arms 41 and ends 42 are also of hollow, foam-filled construction, the arms having outer walls 41*a* respectively unitary with the center column walls 26 and 27 and with outer walls 42*a* of the ends 42, the latter walls 42*a* in turn being unitary with inner arm walls 42*b* which are, in turn, unitary with a recessed, flat, planar, bottom wall 43 for cooperation therewith to define an open-top receptacle 44. The sides of the receptacle 44 are closed, respectively, by side panels 45 which are integral with the opposite sides of the frame 20 and are substantially mirror images of each other. More specifically, each of the side panels 45 is also generally I-shaped in configuration and includes a pair of leg portions 46 integral with the base 30 and projecting upwardly a predetermined distance above the top wall 31 thereof; an upright portion 47 integral with the center columns 25 and projecting forwardly and rearwardly a slight distance beyond the front and rear walls 26 and 27 thereof; and arm portions 48 integral with the top 40 and closing the adjacent side of the receptacle 44. The arm portions 48 project upwardly above and forwardly and rearwardly beyond the ends 42 of the top 40. Each of the arm portions 48 is provided at its distal end with a triangular cutout to define a handle 49.

The cart 10 also includes a cover 50, which is preferably of a double-walled, hollow, molded plastic construction. The cover 50 has a bottom wall 51 unitary at the opposite ends thereof with upstanding end walls 52 and along the opposite sides thereof with upstanding side walls 53. Each of the end walls 52 and side walls 53 is unitary at its upper end with a laterally outwardly extending peripheral lip 54, which curves back inwardly and is in turn unitary with a top wall 55. The bottom wall 51 has a transverse channel 56 formed therein adjacent to one end thereof to define a transverse partition. On one side of the channel 56, the top wall 55 is spaced a very slight distance below the peripheral lip 54 to define a shallow tray receptacle 57. On the other side of the channel 56, the top wall 55 is disposed further below the peripheral lip 54 to define a deeper receptacle 58 which is separated into compartments 58*a* by longitudinal channels 59 formed in the top wall 55. Preferably, the cover 50 is provided with molded ribs and recesses 59*a* in the bottom wall 51 to provide stiffening.

Referring also to FIGS. 6–8, it is a significant aspect of the invention that the cover 50 is mounted for reciprocating sliding movement between a closed position, illustrated in FIGS. 1, 3 and 5, overlying and covering the receptacle 44 in the frame top 40, and an open or extended position, illustrated in FIGS. 2, 4, 6 and 7, uncovering the receptacle 44 to permit access thereto and extending in cantilever fashion from the front end of the frame 20. This sliding movement is accommodated by a pair of slide assemblies 60, respectively disposed along opposite sides of the cover 50. The slide assemblies 60 are arranged as mirror images of each other, so that only one will be described in detail.

Each slide assembly 60 includes a fixed rail 61 having an attachment wall 62 fixedly secured to the inner surface of the adjacent side panel 45 of the cart 10 and extending substantially the length of the top 40 thereof. The attachment 62 wall is integral at its upper and lower ends with laterally inwardly projecting arcuate flanges 63. The slide assembly 60 also includes a sliding rail 64 which is fixedly secured to an upstanding wall of an angle bracket 65 having a laterally outwardly extending support flange 65*a* which underlies and is fixedly secured to the bottom wall 51 of the cover 50. The rail 64 extends substantially the length of the cover 50 and is integral at its upper and lower ends with laterally outwardly extending arcuate flanges 66 which respectively overlie and underlie the flanges 63 of the rail 61. The assembly 60 also includes an elongated cage 67 having laterally outwardly extending upper and lower flanges 68 which respectively extend between the upper and lower sets of the flanges 63 and 66. Each of the cage flanges 68 has a plurality of longitudinally spaced apart apertures therein which respectively trap roller balls 69 for rolling engagement with the rail flanges 63 and 66. Thus, it will be appreciated that the track assemblies 60 provide for smooth, low-friction movement of the cover 50 between its open and closed positions. If desired, a lock (not shown) may be provided to lock the cover 50 in its closed position.

A significant aspect of the invention is that the I-shaped configuration of the cart 10 facilitates its being moved into close proximity to the engine compartment 14 of an associated automotive vehicle 15. Thus, the base 30 can fit beneath the front bumper or fender of the vehicle and the top 40 is of a sufficient height that it can fit over the grille or fender of most automobiles when the hood is open. During many repair and maintenance procedures, the mechanic must work toward the center or back of the engine compartment 14 and if the cart is disposed completely outside the perimeter of the vehicle he must constantly move back and forth for retrieval of tools, instruments and the like. An important aspect of the present invention is that the cover 50, in its open or extended position illustrated in FIG. 2, can extend over the engine compartment 14 a substantial distance so that the mechanic can easily reach tools and other devices carried thereon without having to move his feet.

Another aspect of the invention is that it is adapted for use with a variety of accessories. Thus, each of the side panels 45 is provided in its top edge, midway between the front and rear ends thereof, with a socket 70 (FIGS. 3 and 4) in which may be received an upstanding post 71 (see FIGS. 1 and 2) for supporting at the upper end thereof a literature stand 72 or the like on which repair manuals, specification sheets and the like may be supported for use by the mechanic. Other accessories may be mounted on the outer surfaces of either or both of the ends 42 of the top 40. Thus, a screwdriver rack 73 may be fixedly secured directly, by screws or the like, to the end 42, as illustrated in FIGS. 3 and 5. Alternatively, there may be mounted on the end 42 a mounting track 74 adapted for mounting a number of different types of compatible accessories, such as hanging hooks 75, each of these accessories being provided with mounting lips or rails 77 which mate with the mounting track 74 in a known manner. A free standing bin or bucket receptacle 76 may be seated on the top wall 31 of the base 30, either forwardly or rearwardly of the center column 25 or, alternatively, may be disposed in the receptacle 44 in the top 40. Mounting tracks 74 may also be mounted on either or both of the front and rear walls 26 and 27 of the center column 25 for mounting associated accessories, such as an additional hanging type receptacle 78 (FIG. 5). It will be appreciated that the foregoing accessories are described only for purposes of illustration and that various other types of accessories could also be mounted on the cart 10 and in various other locations thereon.

An important feature of the invention is that the plastic construction of the cart 10 affords simple and inexpensive manufacture. It also prevents scratching of the metal surfaces of the automotive vehicle with which it might come in contact. Furthermore, the plastic cart will not dent or rust and, because it is not painted it will not flake, nor will it show underlying colors in the event it is scratched.

From the foregoing, it can be seen that there has been provided a utility cart which is of simple and economical construction, is uniquely shaped and arranged for use in close proximity to associated vehicles and is readily adaptable for use with a variety of accessories.

We claim:

1. A utility cart comprising: an upstanding substantially flat solid panel wall having an upper end and a lower end and a width and opposite front and rear surfaces, a base unitary with said panel wall at the lower end thereof along the entire width thereof and extending from one of the front and rear surfaces. thereof to a free distal end and having an underside, a top unitary with said panel wall at the upper end thereof along the entire width thereof and extending from one of the front and rear surfaces thereof to a free distal end, a side wall integral with said panel wall and extending to a free distal end, at least one receptacle carried by at least one of said panel wall and said base and said top, and rotatable support means coupled to the underside of said base for rolling movement along an underlying support surface.

2. The utility cart of claim 1, wherein said top and said base extend from said panel wall in the same direction.

3. The utility cart of claim 1, wherein said top and said base extend in opposite directions from said panel wall and terminate in two free distal ends.

4. The utility cart of claim 3, wherein each of said top and said base extends forwardly and rearwardly from said panel wall so that said cart has a generally I-shaped configuration.

5. The utility cart of claim 1, wherein said panel wall and said side wall and said base and said top are all formed of plastic.

6. The utility cart of claim 1, wherein said top defines an open-top receptacle.

7. The utility cart of claim 6, and further comprising accessory carriers respectively carried on said base and said panel wall and in said receptacle.

8. A utility cart comprising: an elongated generally upstanding frame having an underside, said frame including an upstanding substantially flat solid panel wall having an upper end and a lower end and a width and opposite front and rear surfaces, a base unitary with said wall at the lower end thereof along the entire width thereof and extending from one of the front and rear surfaces thereof to a free distal end, a side wall integral with said panel wall and extending to a free distal end, an open-top receptacle carried by said panel wall at the upper end thereof, track means carried by said frame adjacent to said receptacle, a cover slidably engageable with said track means for reciprocating movement between a closed position overlying said receptacle for closing same and an open position extending laterally from said frame in cantilevered fashion and uncovering said receptacle to permit access thereto, and rotatable support means coupled to the underside of said frame for rolling movement along an underlying support surface.

9. The utility cart of claim 8, wherein said cover is disposed generally parallel to the underlying support surface.

10. The utility cart of claim 8, wherein said cover includes means defining a further receptacle.

11. The utility cart of claim 10, wherein said cover includes partition means dividing said further receptacle into plural compartments.

12. The utility cart of claim 8, wherein said track means includes two track assemblies respectively coupled to opposite sides of said receptacle, each of said track assemblies including a first track member carried by said frame, a second track member carried by said cover, and a ball cage supported between said first and second track members and carrying balls in rolling engagement with each of said track members to provide low-friction sliding movement of said second track member relative to said first track member.

13. The utility cart of claim 8, wherein said frame includes a base portion at the lower end of said panel wall defining a shelf which is disposed in use substantially parallel to the underlying support surface.

14. A utility cart comprising: a one-piece solid molded frame formed of a first plastic material and defining a hollow cavity therein, a foamed body of a second plastic material filling said cavity, said frame including a base portion having an underside and an upstanding wall portion and a top portion, said wall portion including an upstanding substantially flat solid panel wall having an upper end and a lower end and a width and opposite front and rear surfaces, said base portion being unitary with said wall at the lower end thereof along the entire width thereof and extending from a one of the front and rear surfaces thereof to a free distal and defining a shelf, said top portion defining an open-top receptacle, and rotatable support means on the underside of said base portion for rolling movement along an underlying support surface.

15. The utility cart of claim 14, wherein said first plastic material is polyethylene and second plastic material is polyurethane.

16. The utility cart of claim 14, wherein said base portion extends laterally in opposite directions from said wall portion at the lower end thereof, and said top portion extends laterally from said base portion at the upper end thereof in the same directions as said base portion so that said frame is generally I-shaped in configuration.

17. The utility cart of claim 16, wherein said top portion has opposite ends and includes handle means at the opposite ends thereof.

18. The utility cart of claim 16, and further comprising auxiliary article support means carried by at least one of said base portion and said upstanding wall portion and said top portion 19. The utility cart of claim 18, wherein said auxiliary support means includes article supports carried by said top portion at the opposite ends thereof.

20. The utility cart of claim 14, and further comprising a plastic cover slidably supported on said top portion for movement between a closed position overlying said receptacle for closing same and an open position extending laterally from said the top portion at one end thereof in cantilevered fashion and uncovering said receptacle to permit access thereto.

* * * * *

UNITED STATES PATENT AND TRADEMARK OFFICE

CERTIFICATE OF CORRECTION

PATENT NO. : 5,269,545

DATED : December 14, 1993

INVENTOR(S) : David A. Huebschen et al.

It is certified that error appears in the above-indentified patent and that said Letters Patent is hereby corrected as shown below:

Column 6, line 2, insert --panel-- before "wall".

Signed and Sealed this

Twenty-sixth Day of July, 1994

Attest:

BRUCE LEHMAN

*Attesting Officer* *Commissioner of Patents and Trademarks*